(12) United States Patent
Gill

(10) Patent No.: US 9,376,050 B1
(45) Date of Patent: Jun. 28, 2016

(54) RESILIENT STRAP MEMBER WITH SIDE RAIL ASSEMBLY

(71) Applicant: FGill Enterprises, L.L.C., Sandy, UT (US)

(72) Inventor: Fred Gill, Sandy, UT (US)

(73) Assignee: Fgill Enterprises, L.L.C., Sandy, UT (US)

( * ) Notice: Subject to any disclaimer, the term of this patent is extended or adjusted under 35 U.S.C. 154(b) by 0 days.

(21) Appl. No.: 14/713,630

(22) Filed: May 15, 2015

(51) Int. Cl.
*B60P 7/08* (2006.01)

(52) U.S. Cl.
CPC .............. *B60P 7/083* (2013.01); *B60P 7/0823* (2013.01)

(58) Field of Classification Search
CPC .............................. B60P 7/0823; B60P 7/083
USPC ...................... 410/50, 96, 97, 100; 24/68 CD, 24/300–302; 248/499
See application file for complete search history.

(56) References Cited

U.S. PATENT DOCUMENTS

| | | | |
|---|---|---|---|
| 3,250,527 A | 5/1966 | Ramsey | |
| 3,377,044 A | 4/1968 | Jackson et al. | |
| 3,403,427 A | 10/1968 | Asseo et al. | |
| 4,111,132 A | 9/1978 | Plut | |
| 4,155,636 A | 5/1979 | Reeberg | |
| 4,648,483 A | 3/1987 | Skyba | |
| 4,716,630 A | 1/1988 | Skyba | |
| 4,754,531 A | 7/1988 | Skyba | |
| 4,842,236 A | 6/1989 | Yonts | |
| 5,074,011 A | 12/1991 | Carlson | |
| 5,111,554 A | 5/1992 | Sweers | |
| 5,146,876 A | 9/1992 | McPhail | |
| 5,288,187 A * | 2/1994 | Ward | B60P 7/13 410/100 |
| 5,398,385 A | 3/1995 | Plut | |
| 5,402,557 A | 4/1995 | Dalen | |
| 5,548,871 A | 8/1996 | Trethewey | |
| 5,611,119 A | 3/1997 | Allen | |
| 5,666,909 A | 9/1997 | Dupre | |
| 5,740,591 A | 4/1998 | Hopkins | |
| 5,762,455 A * | 6/1998 | Long | B60P 7/0823 410/100 |
| 5,873,328 A | 2/1999 | Campbell | |
| 6,048,145 A | 4/2000 | Pedersen | |

(Continued)

FOREIGN PATENT DOCUMENTS

GB    2181345 A    4/1987

OTHER PUBLICATIONS

U.S. Appl. No. 14/167,442, Fgill Enterprises LLC, filed Jan. 29, 2014.

*Primary Examiner* — Stephen Gordon
(74) *Attorney, Agent, or Firm* — Thorpe North & Western LLP

(57) ABSTRACT

A restraint assembly includes at least one strap and a resilient member having two ends, at least one of which is coupled to the strap such that the resilient member is in line with the strap and provides a resilient link within the restraint assembly. A limiter haves at least two ends, each of the ends of the limiter being coupled to the restraint assembly, the limiter being longer than the resilient member when the resilient member is in an un-stretched position, such that the limiter prevents the resilient member from exceeding a maximum predetermined length when the restraint assembly is stretched into a taut condition. At least one side rail is coupled to the resilient member and the strap, the side rail being positioned aside the resilient member and the strap, the side rail including coupling structure operable to couple the resilient member to the strap.

8 Claims, 10 Drawing Sheets

(56) References Cited

U.S. PATENT DOCUMENTS

| | | |
|---|---|---|
| 6,394,720 B1 | 5/2002 | McCay |
| 7,343,648 B2 | 3/2008 | Shaw |
| 2002/0005175 A1 | 1/2002 | Donovan et al. |
| 2002/0138952 A1 | 10/2002 | Chou |
| 2007/0039562 A1 | 2/2007 | Carter |
| 2008/0193248 A1 | 8/2008 | Lindblad |
| 2010/0037833 A1 | 2/2010 | Joung et al. |
| 2011/0000440 A1 | 1/2011 | Mucerino et al. |
| 2012/0234997 A1 | 9/2012 | Rennich |
| 2013/0192539 A1 | 8/2013 | Woodruff et al. |
| 2014/0026373 A1 | 1/2014 | Seader |

* cited by examiner

RESILIENT STRAP MEMBER WITH SIDE RAIL ASSEMBLY

RELATED APPLICATIONS

This application is related to U.S. patent application Ser. No. 14/167,442, filed Jan. 29, 2014, which is hereby incorporated herein by reference in its entirety.

BACKGROUND

1. Field of the Invention

The present invention relates generally to systems for safely and securely shipping and transporting loads. More particularly, the present invention relates to "tie down" or restraint straps for securing a load for storage or transportation.

2. Related Art

Numerous items are loaded and shipped each day in setting such as consumer travel, trucking lines, airline applications, railroads transport and the like. Examples include, without limitation, commercial packages, barrels, crates, vehicles, etc., that are stored on shipping trucks, trains, or aircraft. Additionally, ATVs, motorcycles, camping gear, etc., may be transported on private vehicles on roof racks, truck beds, trailers, etc.

The need for such loads to be well secured is appreciated by anyone with any experience in transporting goods. If any secured item becomes inadvertently dislodged during transport, the results can be catastrophic. Even if the secured item doesn't damage another vehicle, it can itself become damaged to a large extent.

While a variety of known strap systems have been used to secure such loads, significant problems remain with such systems.

SUMMARY OF THE INVENTION

It has been recognized that it would be advantageous to develop a securing or strapping assembly that can adjust to varying tensioning conditions during the shipping process.

In accordance with one embodiment, a strap assembly is provided, including at least one strap and a resilient member having two ends, at least one of which is coupled to the strap such that the resilient member is in line with the strap and provides a resilient link within the restraint assembly. A limiter can have at least two ends, each of the ends of the limiter being coupled to the restraint assembly. The limiter can be longer than the resilient member when the resilient member is in an un-stretched position, such that the limiter prevents the resilient member from exceeding a maximum predetermined length when the restraint assembly is stretched into a taut condition. At least one side rail can be coupled to the resilient member and the strap, the side rail being positioned aside the resilient member and the strap, the side rail including coupling structure operable to couple the resilient member to the strap.

In accordance with another embodiment of the invention, a restraint assembly is provided, including a strap and a resilient member having two ends. At least two side rails are provided, one of which is coupled to one end of the resilient member and to the strap, and an other of which is coupled to an other end of the resilient member and to the strap. A limiter can have at least two ends, one of which is coupled to one of the side rails and an other of which is coupled to an other of the side rails. A first and second end fitting can be provided, the first end fitting coupled to the strap on one end, the second end fitting coupled to the strap on an opposite end. A fastener device can be coupled to the restraint assembly, the fastener device being operable to securely engage the strap and hold the strap in a taut condition. The limiter can be longer than the resilient member when the resilient member is in an un-stretched position, such that the limiter prevents the resilient member from exceeding a maximum predetermined length when the restraint assembly is stretched into a taut condition.

In accordance with another aspect of the invention, a restraint assembly is provided, including at least one strap and a resilient member having two ends, at least one of which is coupled to the strap such that the resilient member is in line with the strap and provides a resilient link within the restraint assembly. An extendable limiter can be provided that includes two ends, each of the ends of the limiter being coupled to the restraint assembly. At least one side rail can be coupled to the resilient member and the strap, the side rail being positioned aside the resilient member and the strap, the side rail including coupling structure operable to couple the resilient member to the strap.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
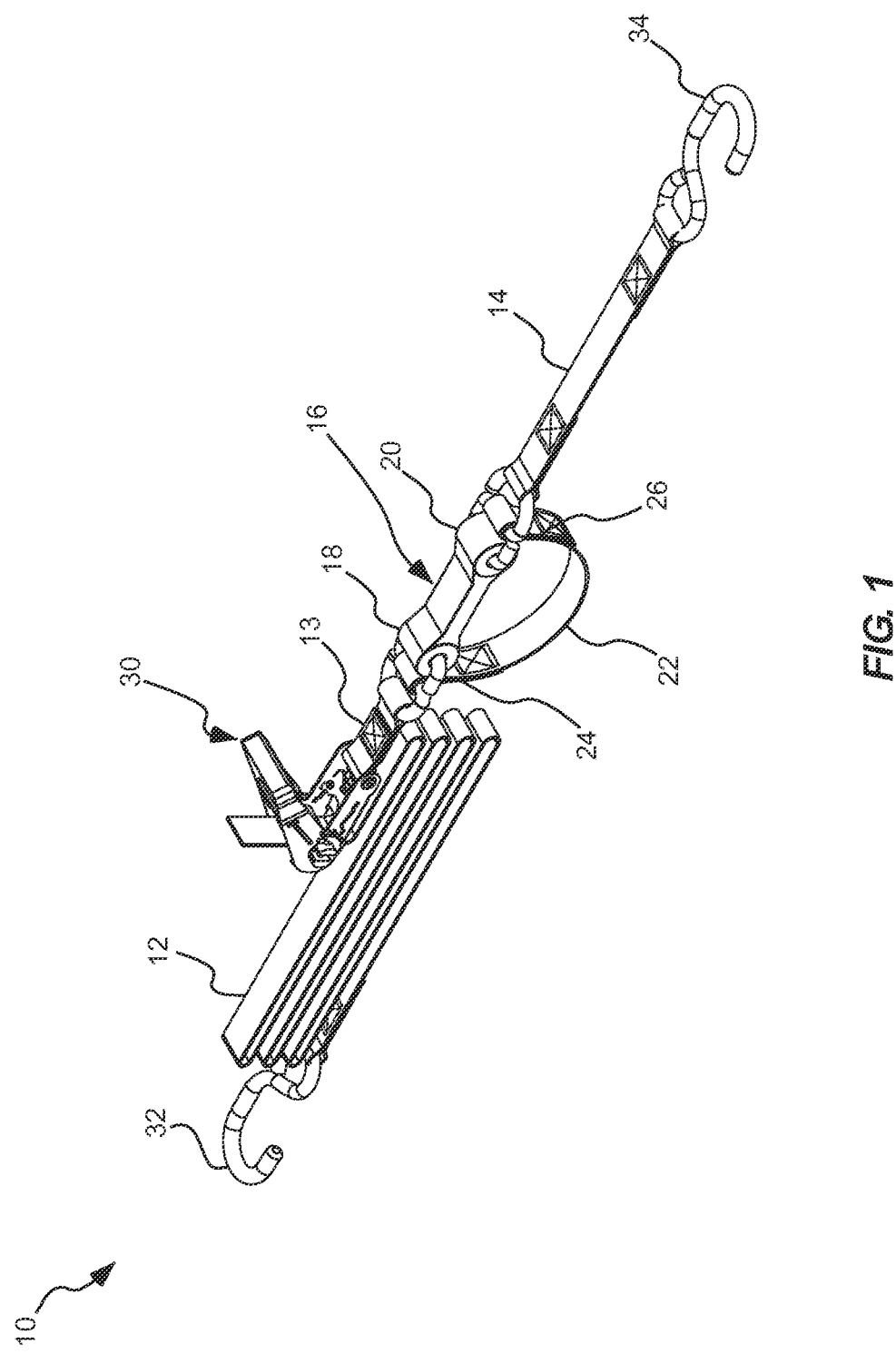
FIG. 1 is a perspective view of a strap assembly in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

As used herein, the singular forms "a" and "the" can include plural referents unless the context clearly dictates otherwise. Thus, for example, reference to "a strap" can include one or more of such straps.

As used herein, the terms "attached," "coupled," "fixed," etc., can be used to describe a condition in which two or more components are coupled to one another in such a manner that they function as intended: that is, the force required to uncouple the components is sufficiently large such that the components will remain attached to one another during the service for which they were designed. Unless indicated to the contrary, such "coupled" components can be separable if sufficient force is applied to the components. In some aspects of the invention, components are elastically fixed or coupled to one another and will remain fixed during the useful life of the product for which they are designed; however, they may be uncoupled from one another using an appropriate level of force (applied in an appropriate manner and location), and will return to an original configuration (e.g., a condition, state, shape, size, etc.), which existed prior to the components being coupled to one another.

As used herein, the term "substantially" refers to the complete or nearly complete extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

The terms "in-line," "in parallel," "in series," etc., are used herein to describe the relationship between various components as loads are applied to and/or carried by such components. For example, a load carried by components that are "in-line" or "in series" is applied equally to each of those components (end-to-end). A load carried by components that are "in parallel" is divided between those components. This relationship of force is analogous to the terms as they are used in electrical circuits. Two straps that are coupled end-to-end are in series or in-line with one another. Two straps that are coupled to the same end points, but lie substantially parallel to one another are in parallel, as that term is used herein.

Invention

As is generally illustrated in the figures, and discussed in more detail below, the present technology provides a strap system that can be advantageously used to secure a wide variety of cargo during transportation. The strap system is well suited for use in consumer applications (e.g., pick-up truck beds, trailers, etc.), commercial applications such as trucking, railroad, marine-craft and aircraft, etc. While basic "tie-down" systems have been used with some success in the past, they suffer from a number of disadvantages. For example, one major problem with currently employed securing systems is that these systems are substantially static, meaning that they implement only fairly rigid straps, ropes, or other cord-like systems which are designed to apply a static tension to hold the load in position.

One problem which arises from these conventional systems is that the straps, while secure initially, can become loosened as the vehicle vibrates or is jarred either through micro-movements caused by the vibration, or by plastic deformation or other slippage which may occur when the load is jarred. Once the strap system becomes loosened, the integrity of the tie-down is significantly comprised due to any number of factors. One factor which compromises the tie-down's integrity arises from the fact that, after the tie-down becomes loosened, the position of the straps may more easily shift relative to the load, which may allow the load to slip out from under the straps.

An additional factor arises when, once the tie-down is loosened, any subsequent shifting or jarring of the cargo allows for the cargo to accelerate for a small distance prior to engagement of the strap and thereby apply a dynamic load to the strap, which may result in tie-down failure. The foregoing examples are not intended to recite an exhaustive list of reasons why a loose tie-down may be inadequate, rather, the foregoing examples merely illustrate that it is generally undesirable to have loose tie-downs on a piece of cargo.

The present invention addresses this and other issues by providing a strap assembly having at least one strap and a resilient member or link within the assembly. This resilient member is intended to be stretched, i.e. elastically expanded along the length of the strap assembly. This resilient member or link within the assembly allows the strap assembly to apply a relatively constant tension to the load or cargo, even given a certain amount of slippage or loosening of the strap assembly due to any vibration or jarring of the load.

This is accomplished by providing a certain amount of damping to vibration, with the vibrations being absorbed by the resilient member. Furthermore, there is a certain degree of elasticity that allows for small movements in the event of a sudden force upon, and subsequent shift of, the cargo. In which case, the resilient member is expanded or stretched rather than allowing the strap to become loosened or moved relative to the secured load.

Additionally the resilient member may be further reinforced by a limiter assembly. This limiter may be coupled to the strap assembly on one or more opposing sides of the resilient member. The limiter can be configured so as to be longer than the resilient member in an un-stretched state. By providing a limiter in such a fashion, the limiter remains un-engaged until the resilient member is stretched sufficiently such that its length matches the length of the limiter. After the resilient member is stretched to such a length, the limiter is engaged and thus prevents the resilient member from stretching further and perhaps exceeding its elastic load capacity.

Figure 2:
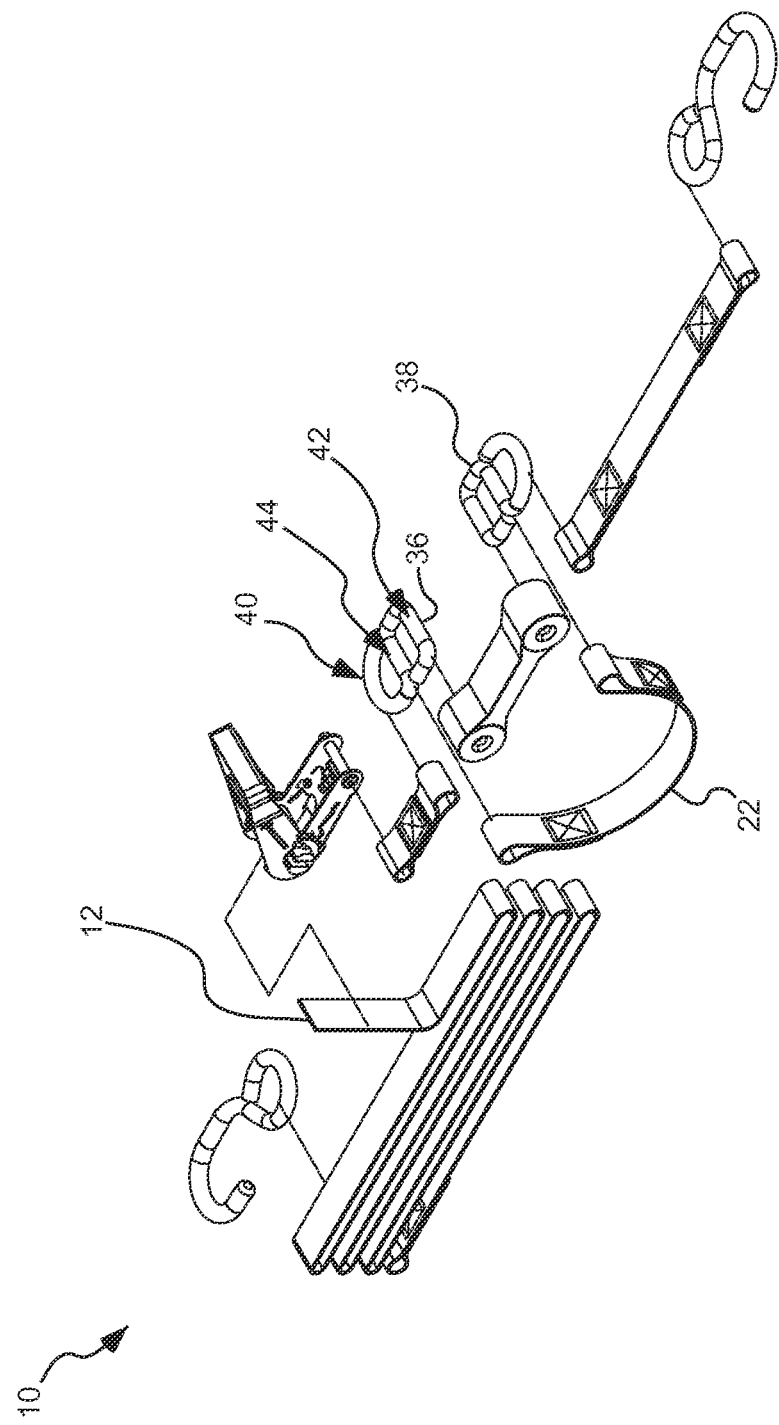
FIG. 2 is a perspective, exploded view of the strap assembly of FIG. 1.

Turning now specifically to the figures, FIGS. 1 and 2 illustrate an en-exemplary embodiment of the invention that includes a restraint assembly 10. The assembly can include two or more straps 12, 13, 14. A resilient member 16 can include a first end 18 and a second end 20. The resilient member can be coupled to the straps such that the resilient member is in line with the straps and provides a resilient link within the restraint assembly. A limiter 22 can have at least two ends 24, 26. Each of the ends of the limiter can be coupled to the restraint assembly in various locations. The limiter is generally longer than the resilient member 16 when the resilient member is in an un-stretched position. In this manner, the limiter 22 prevents the resilient member 16 from exceeding a maximum predetermined length when the restraint assembly is stretched into a taut condition.

While the various components can be formed from a range of materials, in one aspect, the straps 12, 13, 14 and limiter 22 are formed from nylon webbing, a known material used in such applications as tie-down straps and the like. Such webbing typically will not stretch a great deal from an initial configuration (on the order of about 3%). Thus, the webbing, while stretching slightly when placed into tension, is not designed to extend to any great degree when pulled taught. The resilient member, however, can be formed from thermoplastic elastomer (TPE) or thermoplastic rubber (TPR). This material will typically stretch a great deal, up to about 200% of an initial configuration. The resilient member can thus stretch much more than can the straps and limiter. In one aspect of the invention, the resilient member is capable of elastically stretching about five times or more than will the webbing material. In one aspect, the resilient member is formed from Elastollan® TPU (thermoplastic polyurethane).

While not so required, in one aspect of the invention, the resilient member 16 is formed of TPE, TPR or TPU. It can include an overall length of about 4.88 inches, a width of about 1 and ⅛ inches in the center of the member), and a thickness (in the center of the member) of about 0.5 inches.

In the example shown, a fastener device 30 is provided that can be coupled within the restraint assembly 10. The fastener device is operable to securely engage the strap and retain the strap in a taut condition. As shown, the fastener device is coupled between, and in-line with, straps 12 and 13. In this example, the fastener device comprises a known ratcheting device through which one strap (strap 12 in this case) is threaded. The other end or side of the ratcheting device is coupled to strap 13. The ratcheting device can be used to incrementally and securely tighten the restraint assembly about, around or over a load to be secured.

A pair of end fittings 32, 34 can be coupled on opposing ends of the restraint assembly. In the example shown, the end fittings comprise a pair of hooks that can be coupled to auxiliary structure to secure a load (see, e.g., FIG. 6 and the related discussion for more details on this aspect).

FIG. 2 illustrates the restraint assembly 10 in exploded view. In this view, one or more coupling rings 36, 38 can be seen more clearly. The coupling rings can aid in coupling the various components of the system one to another. In one aspect of the invention, the coupling rings can include at least two outer connection points 40, 42 (shown for ring 36 only). One outer connection point 40 can couple the ring to the strap 12 and one outer connection point 42 can couple the ring to the resilient member 16. An inner connection point 44 can be positioned intermediate the outer connection points. The inner connection point can couple the ring 36 to the limiter 22.

Figure 5:
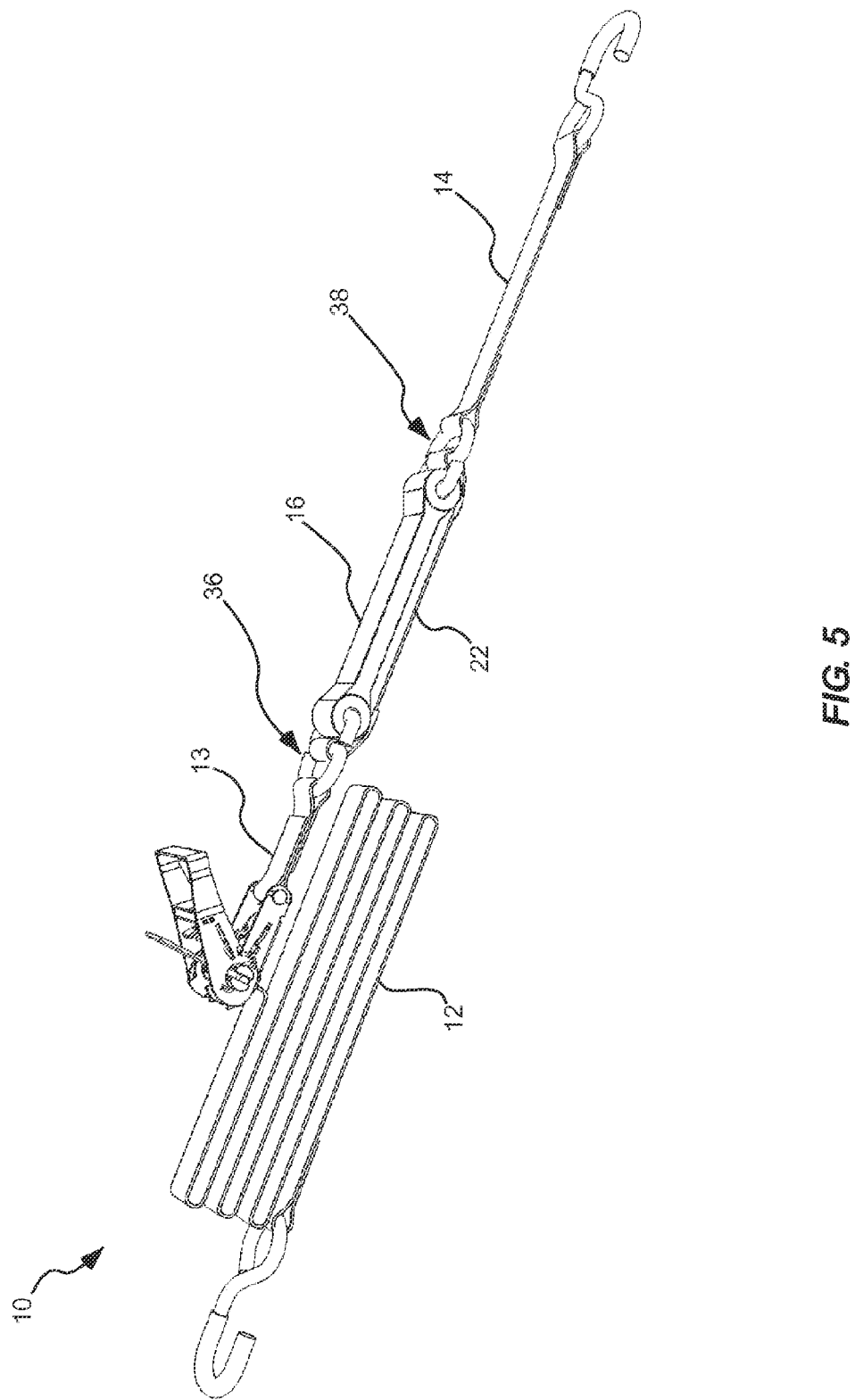
FIG. 5 is a perspective view of the strap assembly of FIG. 1, shown in an extended or taught condition.

In this manner, the limiter 22 and the resilient member 16 can be configured in a parallel relationship. Thus, as the various strap members are pulled into a taught condition (see, e.g., FIG. 6), the resilient member 16 is also stretched into a taught condition. As also shown in FIG. 5, once the resilient member is stretched to a predetermined maximum length, the limiter 22 is engaged and stretched taught between coupling rings 36 and 38. The limiter then serves to prevent further stretching of the resilient member. Once the restraint assembly 10 is pulled into this configuration, the restraint assembly can maintain a secure restraining force over, around or about a load and will not become loose during transit.

Figure 3:
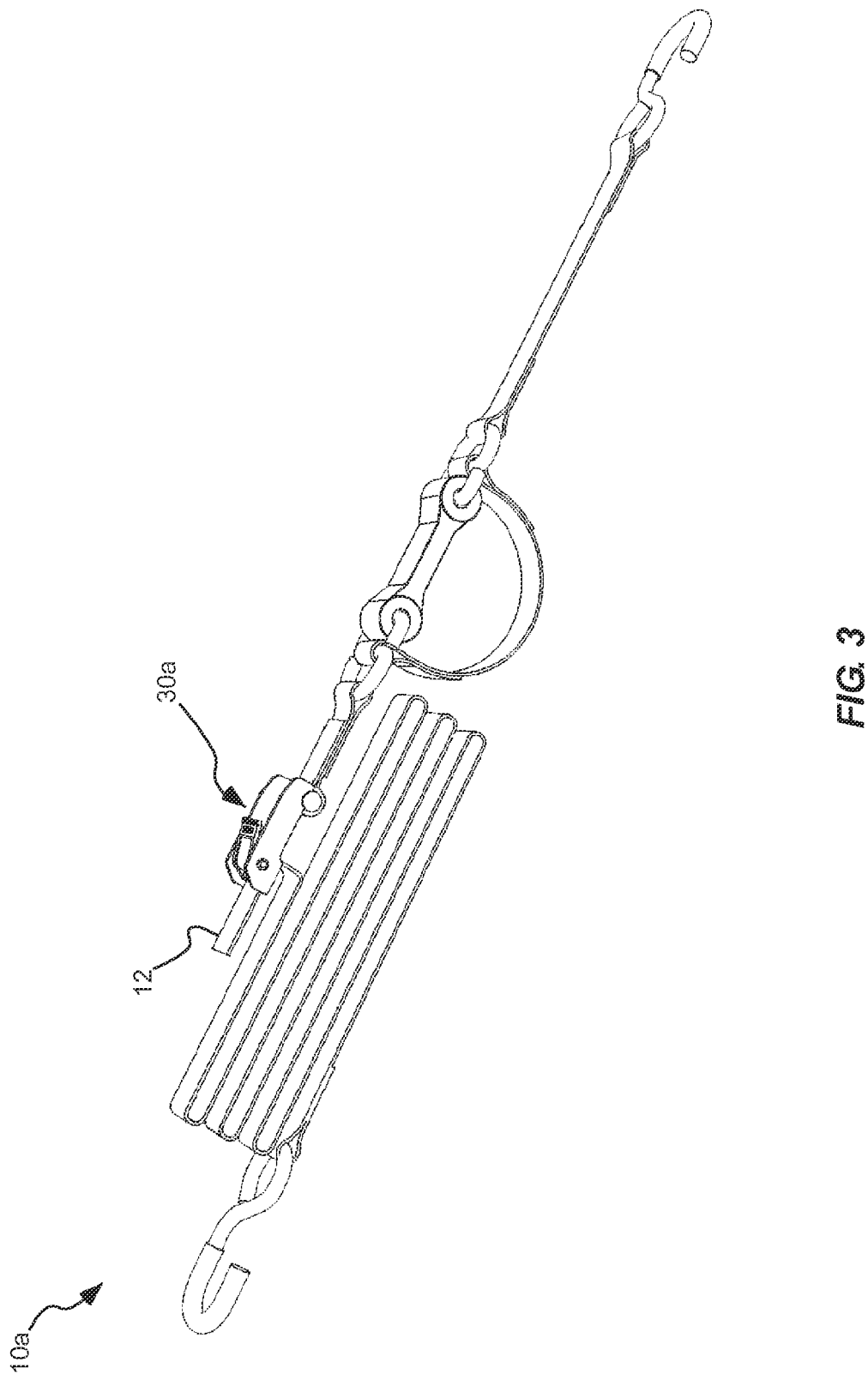
FIG. 3 is a perspective view of another strap assembly in accordance with an embodiment of the present invention.

FIG. 3 illustrates an alternate embodiment of the invention in which the fastener device 30a comprises a cam-lock device. In this embodiment, the strap 12 simply pulled through the cam-lock device, and once tensioned is released. At this point, the cam-lock device engages the strap and prevents it from retracting back through the cam-lock.

Figure 4:
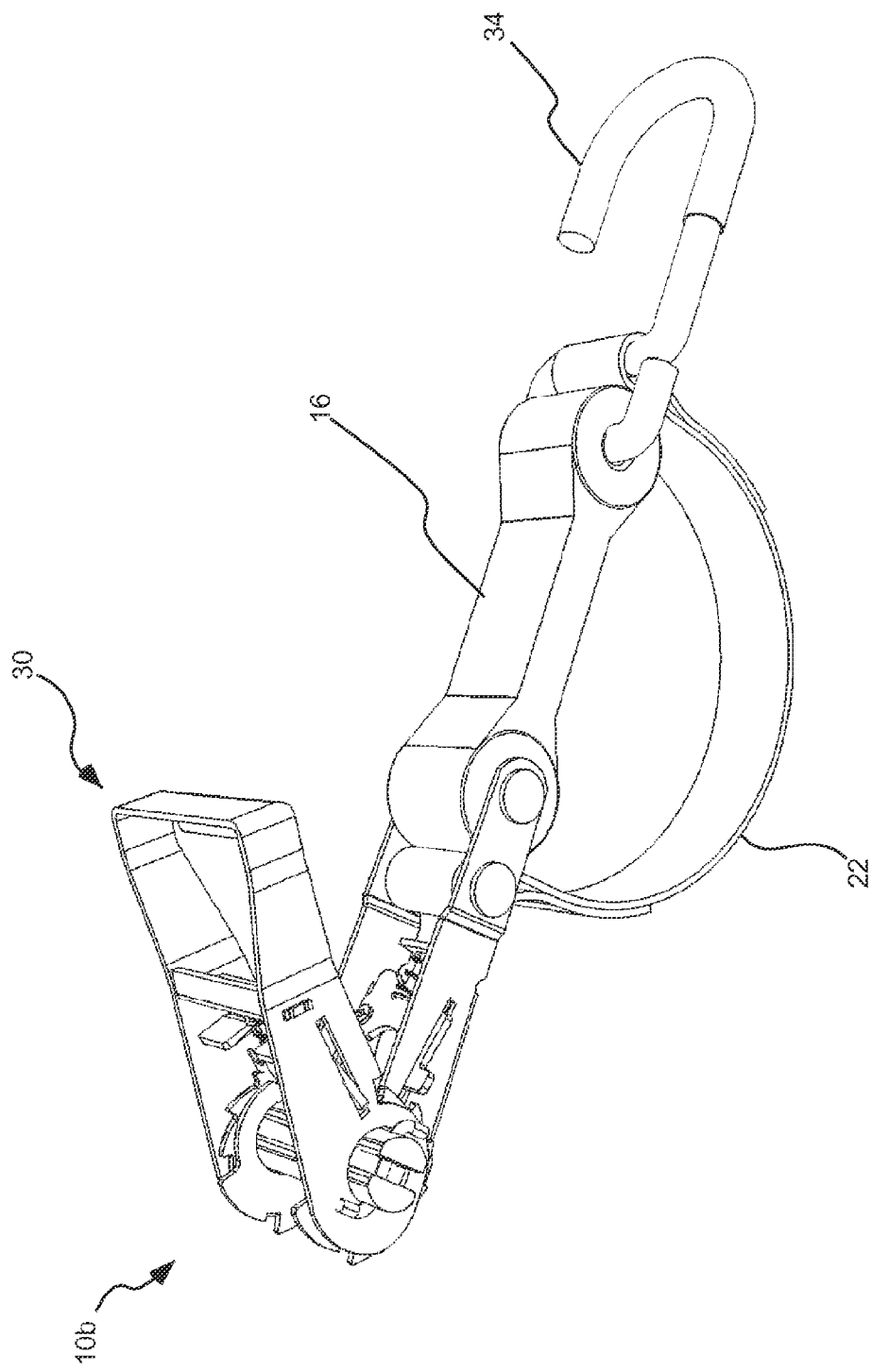
FIG. 4 is a perspective view of another strap assembly in accordance with an embodiment of the present invention.

FIG. 4 illustrates an alternate embodiment of the invention in which the resilient member 16 and the limiter 22 are directly coupled between end fitting 34 and ratcheting device 30. This embodiment of the invention can be advantageous in applications where a user wishes to use his- or her-own strap (not shown) in connection with the current system. This may be the case where a particular application already includes a strap (perhaps already attached to another device) and straps 12, 13, 14 are not desired.

FIG. 5 shows resilient member 16 and the limiter 22 as they would appear under load, with the limiter stretched to such a degree that further stretching of the resilient member 16 is prevented. Stretched to this limit, the resilient member is well suited to absorb small vibrations, yet still allow a certain degree of elasticity which allows for small movements in the event of a sudden force upon, and subsequent shift of, the cargo. This prevents the overall strap assembly from loosening slowly over time due to vibrational forces.

Figure 6:
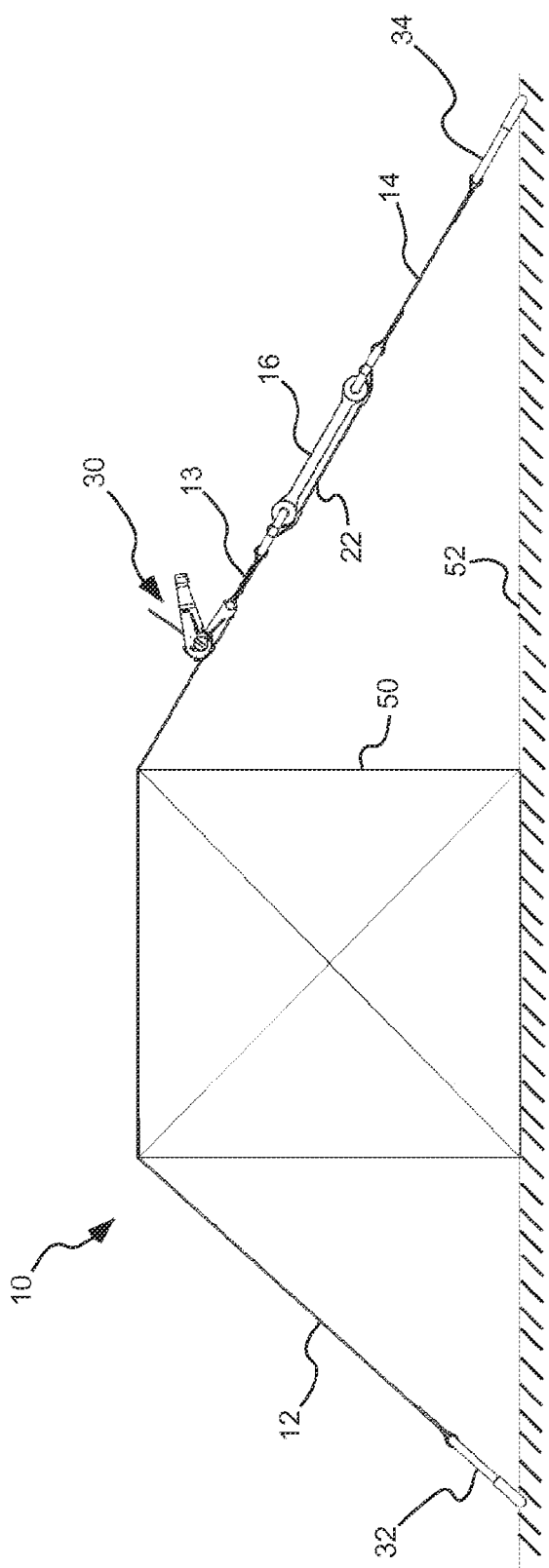
FIG. 6 is a side view of the strap assembly of FIG. 1, shown securing a load to an arbitrary surface.
Figure 7:
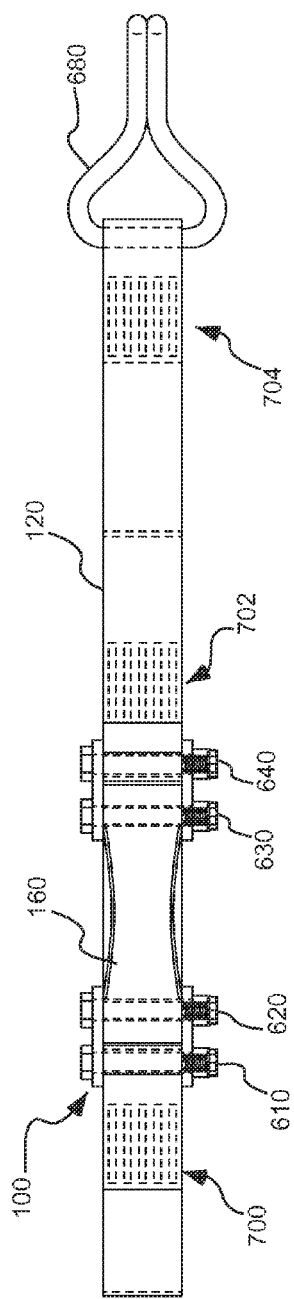
FIG. 7 is a top view of another strap assembly in accordance with an embodiment of the invention.

FIG. 6 illustrates the system in use securing a random load 50. The load can, of course, be any number of items such as a crate, a barrel, an ATV, cooler, etc. As shown, end fittings 32, 34 are coupled to some external structure 52 (such as a trailer bed, truck bed, marine vessel, rail car, etc.). Once properly positioned, the ratcheting device 30 can be activated to stretch or pull straps 12, 13, 14 into a taught condition. At this point, the ratchet device can continue to be activated until resilient member 16 is pulled taught and, eventually, until limiter 22 is engaged. The resulting configuration very securely engages the load 50, and is immune to becoming loosened during movement of the external structure 52, even in very severe vibrational and erratic movements.

FIGS. 7, 8, 9 and 10a-10b illustrate a further embodiment of the invention in which a side rail assembly 100 is utilized to secure the resilient member 160 to the strap 120. In this aspect, the resilient member 160 includes a generalized "dog bone" shape, as described throughout, with openings formed on each end of the member: these openings are oriented in a direction orthogonal to the direction of extension of the member (e.g., into the page of FIG. 8). Anchors or fasteners 610, 620, 630, 640, etc., can be installed through the openings formed in the resilient member, as well as through openings 660, 662 formed in side rail 600 (see FIGS. 10a, 10b for example).

In use, one or a pair of side rails 600 is positioned adjacent the resilient member 160 and adjacent the strap 120. Anchors

610, 620, etc. can be installed through the side rail 600 and properly secured (via, for example, a threaded fastener, a pin, etc., as would be appreciated by one of ordinary skill in the art having possession of this disclosure). The anchors can be installed through loops (discussed in more detail below) formed in the strap 120 and properly secured. In this manner, the resilient member is securely attached to the strap. In the example shown in FIGS. 8 and 9, limiter 220 is positioned adjacent (below) the resilient member, and in line physically with the resilient member.

The side rail assembly 100 provides a secure coupling between the resilient member 160 and the strap 120. The side rails 600 (used in pairs, where appropriate) provide a rigid support that is not as susceptible to twisting or binding as are conventional components. The present technology also provides a manner by which the resilient member (or strap) can be replaced or interchanged, as desired, by simply removing the anchors 610, 620, 630, 640, etc. Thus, if a resilient member is damaged, or if a user wishes to utilize a resilient member having different load characteristics, he or she can quickly and easily change the resilient member configuration.

The anchors can be installed relative to the side rails at an orthogonal angle. In this manner, the loads experienced by the strap loops, the strap, the openings in the resilient member, and the resilient member can be applied in the best possible orientation. In conventional systems, a hook or other structure looped through the resilient member may apply point loads if twisted or pulled too far. Such point loading can lead to premature damage or failure of the resilient member or the strap. The present technology better maintains proper alignment of the side supports (rails), and cross load bearing members (anchors) during use of the system.

Figure 8:
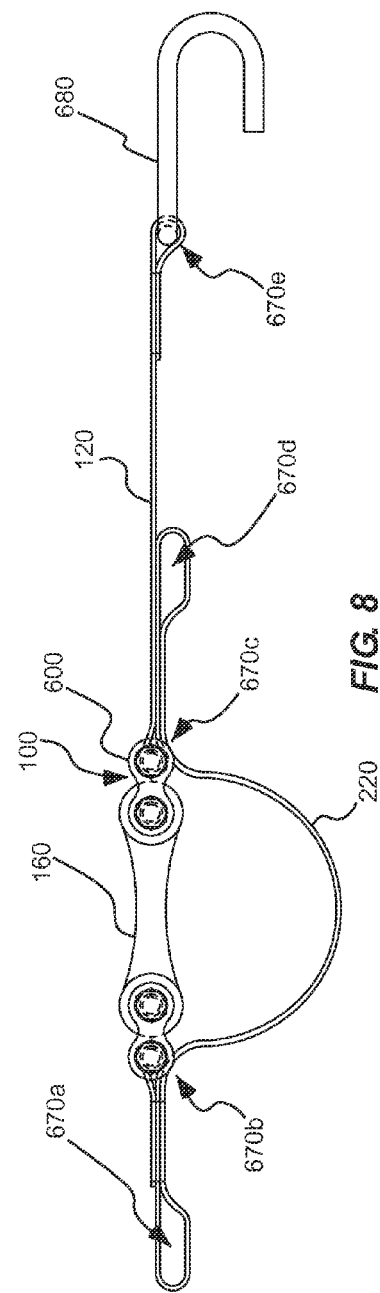
FIG. 8 is a side view of the strap assembly of FIG. 7.
Figure 9:
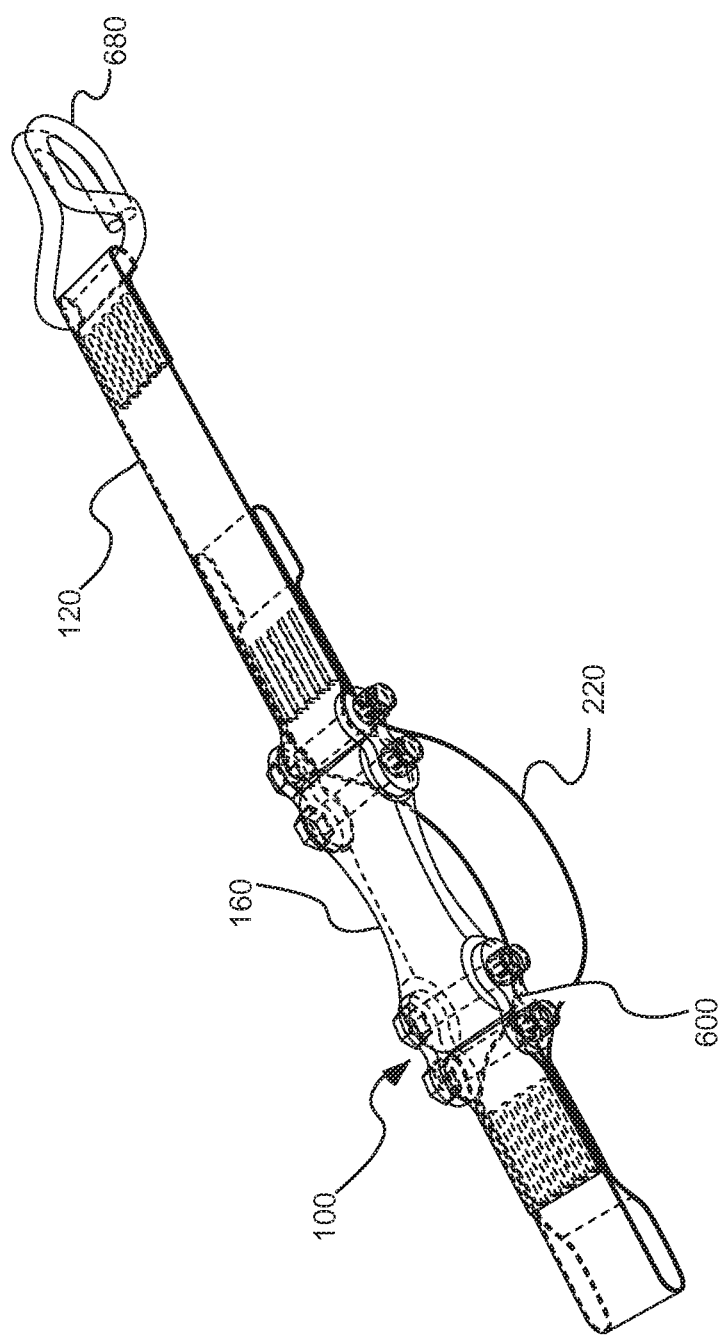
FIG. 9 is a perspective view of the strap assembly of FIG. 7.

The strap 120 can be formed from a continuous piece of material that can be folded over upon itself and secured relative to itself to form the various components. For example, loops 670a, 670b, 670c, 670d and 670e are shown in FIG. 8. Loop 670a can be utilized to attach the strap to fastening device, such as a cam lock or ratchet, as discussed above. Either or both of these types of fastening devices can be used in this embodiment, as will be appreciated from the discussion above.

In the example shown, a continuous loop hook 680 is attached through loop 670e. Loops 670b and 670c are used in connection with side rail assemblies 100 to attach the resilient member to the strap. In one embodiment, the strap 120 is coupled to itself, or reinforced, at desired locations by threaded sewing joints. See, for example, locations 700, 702, 704, etc., in FIG. 7, which illustrate threaded reinforced or attachment points.

Figure 10B:
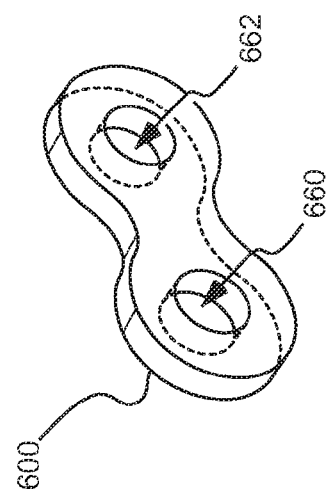
FIG. 10*b* is a perspective view of the side rail of FIG. 10*a*.
Figure 10A:
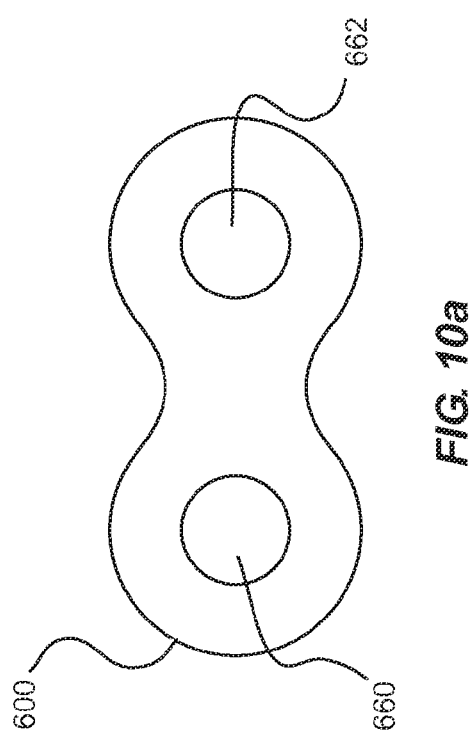
FIG. 10*a* is a side view of the side rail of FIG. 7.

FIGS. 10a and 10b illustrate an exemplary side rail 600 in more detail. The side rail can be formed from a variety of materials, including, without limitation, mild steel. While not so limited, the side rail can include a length of about 1.875 inches, a thickness of about 0.1875 inches, and a height (top to bottom in FIG. 10a) of about 0.875 inches. The distance between openings 660 and 662 can be about 1.0 inch (on center).

Figure 11:
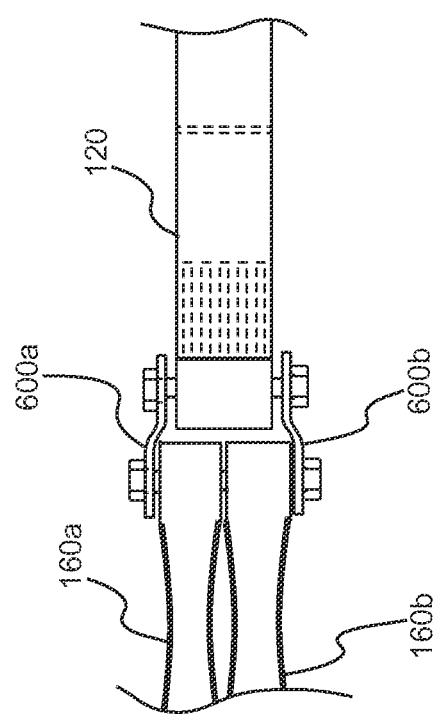
FIG. 11 is a partial view of another strap assembly in accordance with an embodiment of the invention.

FIG. 11 illustrates another embodiment of the invention in which a pair of resilient members 160a, 160b are arranged in a side-by-side configuration. In this aspect, the side rails 600a, 600b can include a dogleg or stepped configuration that extends (when used in the pairings shown) from a wider spacing adjacent the two resilient members to a more narrow spacing adjacent the strap 120.

This aspect of the invention allows the use of two resilient members with the same strap, tensioning members, fastening devices, etc., discussed above. Using two resilient members in a side-by-side relationship can provide increase load rating while only slightly increasing the effective width of the resilient members.

In addition to the structural elements discussed above, the present invention provides a method of providing a secure connection between two connection points comprising. The method can include connecting a restraint assembly between two connection points. The restraint assembly can include: at least one strap; a resilient member oriented in-line with the strap; and a limiter configured to limit the resilient member to a maximum predetermined length. The method can include tensioning the restraint assembly in order to cause the resilient member to stretch to a length beyond its initial un-stretched length but not to an extent greater than that allowed by the limiter. The method can include tensioning the restraint assembly includes utilizing a ratcheting mechanism provided in-line with the strap assembly to provide the tensioning force to the restraint assembly.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A restraint assembly comprising:
a strap;
a resilient member having two ends;
at least two side rails, one of which is coupled to one of the ends of the resilient member and to the strap, and an other of which is coupled to an other of the ends of the resilient member and to the strap;
a limiter having at least two ends, one of which is coupled to one of the side rails and an other of which is coupled to an other of the side rails;
a first and second end fitting, the first end fitting coupled to the strap on one end of the strap, the second end fitting coupled to the strap on an opposite end of the strap; and
a fastener device coupled to the restraint assembly, the fastener device being operable to securely engage the strap and hold the strap in a taut condition; wherein
the limiter is longer than the resilient member when the resilient member is in an un-stretched position, such that the limiter prevents the resilient member from exceeding a maximum predetermined length when the restraint assembly is stretched into a taut condition.

2. The assembly of claim 1, wherein the fastener device comprises a ratcheting device, the ratcheting device allowing incremental tightening of the strap to provide leveraged tightening of the restraint assembly between two connection points.

3. The assembly of claim 1, wherein the fastener device comprises a cam lock.

4. The assembly of claim 1, wherein the limiter is separate from the resilient member and is positioned aside the resilient member.

5. The assembly of claim 1, wherein each side rail includes a rigid plate.

6. The assembly of claim 1, further comprising a pair of side rails, each of the pair of side rails being positioned on opposing sides of the resilient member and the strap.

7. The assembly of claim 6, further comprising a second pair of side rails, one of the pairs of side rails being positioned on opposing sides of each end of the resilient member.

8. The assembly of claim 6, further comprising a pair of anchors coupling the resilient member to the strap, one anchor of the pair of anchors coupled to the strap and to one of the side rails, and an other anchor of the pair of anchors coupled to the resilient member and to one of the side rails.

* * * * *